United States Patent [19]

Lubbering et al.

[11] Patent Number: 5,088,242
[45] Date of Patent: Feb. 18, 1992

[54] POLISHING DEVICE

[75] Inventors: Johannes Lubbering, Herzebrock; Peter Ihme, Dusseldorf; Jurgen Busse, Monchengladbach; Erwin Schmitz; Wolfgang Volker, both of Tonisvorst, all of Fed. Rep. of Germany

[73] Assignee: Messer Griesheim, Fed. Rep. of Germany

[21] Appl. No.: 498,768

[22] Filed: Mar. 26, 1990

[30] Foreign Application Priority Data

Apr. 1, 1989 [DE] Fed. Rep. of Germany ....... 3910581
Apr. 1, 1989 [DE] Fed. Rep. of Germany ....... 3910582
Apr. 1, 1989 [DE] Fed. Rep. of Germany ....... 3910590

[51] Int. Cl.⁵ .............................................. B24B 55/02
[52] U.S. Cl. .................................... 51/266; 51/170 T; 51/322
[58] Field of Search ................ 51/170 T, 170 R, 266, 51/322

[56] References Cited

U.S. PATENT DOCUMENTS

| 1,862,135 | 6/1932 | Bucy | 51/134.5 |
| 2,182,952 | 12/1939 | Todd et al. | 51/356 |
| 2,198,282 | 4/1940 | Hall | 51/266 |
| 3,990,124 | 11/1976 | Mackay, Jr. et al. | 51/378 |

FOREIGN PATENT DOCUMENTS 1546589 5/1979 United Kingdom .
1546590 5/1979 United Kingdom .

Primary Examiner—M. Rachuba
Attorney, Agent, or Firm—Connolly & Hutz

[57] ABSTRACT

A polishing device has a working area into which cold gas is fed continuously in order to cool the partial workpiece surfaces where work is to be performed to a temperature at which no changes occur to the work-piece surface except for polishing.

14 Claims, 3 Drawing Sheets

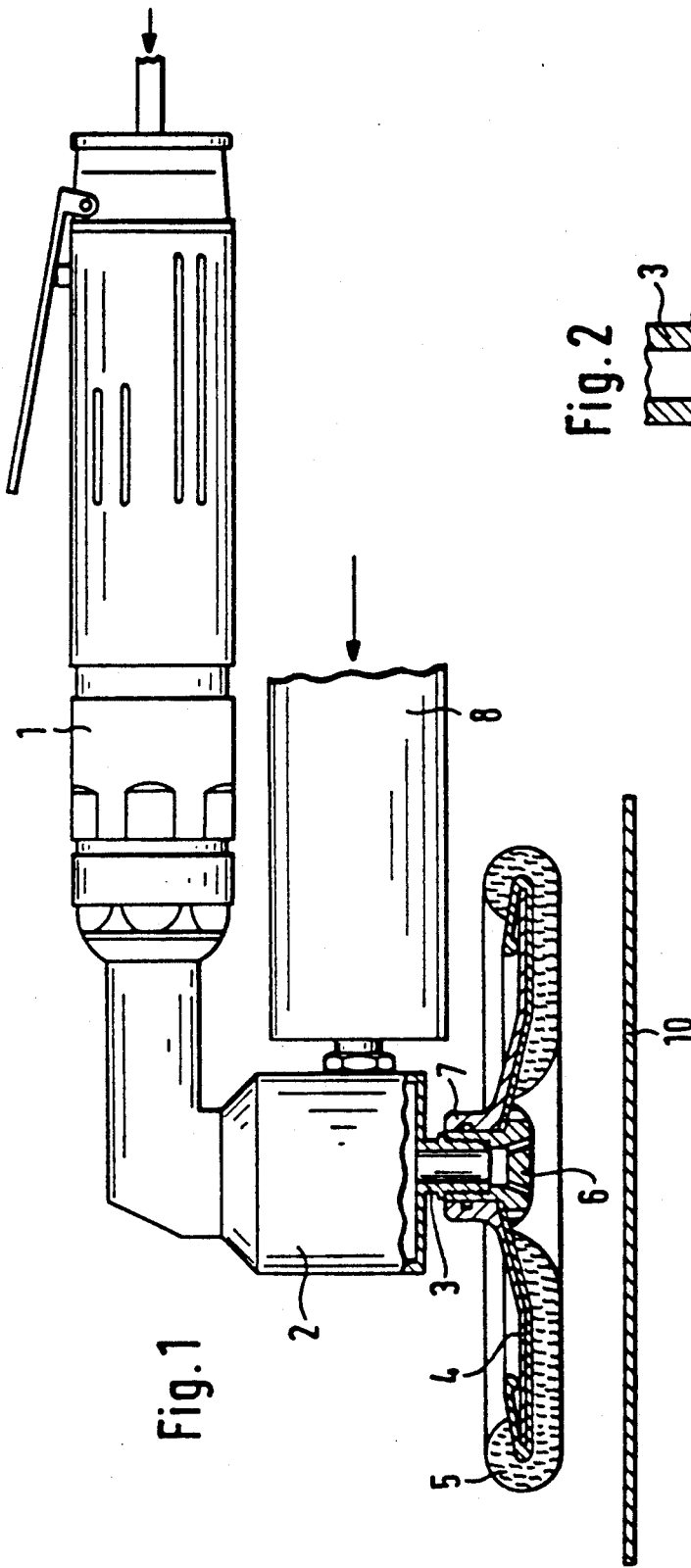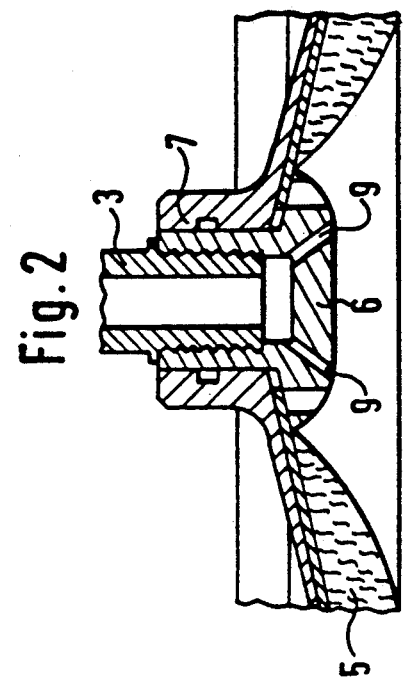

POLISHING DEVICE

BACKGROUND OF INVENTION

A process to touch up painting flaws is known in which, after polishing, the flawed site is surrounded by a foam ring and the area delimited by the ring is cooled down to a temperature of approximately minus 40° C. (minus 40° F.) by means of gaseous nitrogen having a temperature of approximately minus 160° C. (minus 256° F.). After this temperature has been reached, the polishing operation is started. As soon as the cooled site has warmed up to a temperature of approximately minus 10° C. (14° F.), the polishing operation is discontinued and the site is cooled down once again.

In order to improve this discontinuous process, the suggestion has been made to carry out the cooling down and the polishing operations simultaneously. However, no statements are made as to how this could be accomplished.

This discontinuous process has the disadvantage that it is time-consuming and expensive with respect to the necessary equipment. A ring is needed to isolate the flawed site, several cooling phases are necessary and the polishing disk has to be taken out of the ring in order to apply the polishing agent.

SUMMARY OF INVENTION

The object of the invention is to create a device which is easy to handle and with which it is possible to work in a continuous manner.

This object is attained according to the invention as follows. In order to process the work piece, for example, to polish a flawed site of a painted work piece, such as the body of car, it is necessary to maintain a certain temperature at the site where the work is to be performed in order to prevent the paint from becoming soft. Measurement of this temperature at the site where the work is to be performed can only be achieved by very complex means. Surprisingly, it has been found that the temperature of the cold gas as it enters the inlet of the tool is a good indicator of the temperature at the site on the work piece where the work is to be performed. One explanation for this is that the temperature at the site where the work is to be performed remains constant when the flow of cold gas is constantly and uniformly distributed over the entire are of the polishing disk where the work is to be performed, and when there is a constant and sufficient cooling supply. In this manner, it is possible to ascertain the amount of cooling per time unit necessary for a certain job or type of work and to provide this cooling by appropriately dosing the flow of cold gas. In addition to polishing painted or otherwise coated work pieces made of metal, plastics or wood, the invention can also be employed to polish other surfaces.

Besides being dependent on the temperature, the cooling supply also depends on the pressure of the cold-gas flow which determines the amount of gas. For this purpose, according to the invention, a pressure sensor is installed in the flow path of the cold gas before the after-heating unit.

According to the invention, the temperature at the inlet of the cold-gas flow (operating temperature) which is needed to carry out the work and the necessary gas pressure are ascertained and set by means of a process control mechanism. This control mechanism regulates the performance of the tank evaporation and of the after-heating unit as a function of the ascertained temperature and pressure values. Regulation of these values leads to economical consumption of cold gas.

In order to prevent the temperature from exceeding or falling below the set value, according to another proposal of the invention, an additional temperature sensor is installed in the flow path of the cold gas beyond the after-heating unit.

In order to operate the tool, it is important to cool it down to the necessary operating temperature before starting the work. Moreover, a stand-by temperature can be selected, which is then set by the control mechanism after a given time. This stand-by temperature is not sufficient for the polishing operation. It serves to keep the tool cold during interruptions in the work by means of a smaller amount of gas and/or of a higher cold-gas temperature for purposes of quickly re-establishing the operating temperature.

In order to ensure that the work is not started before the operating temperature has been reached, for example, when a tool operated with compressed air is used, according to the invention it is suggested that a pressure-differential sensor be installed in the compressed-air supply line. This regulator has the function of closing the influx of air by means of a solenoid valve when the tool is turned on and the operating temperature has not been reached, so that the pressurized-air motor cannot run. It is also possible to use tools with an electric motor.

There is an optical display for purposes of showing the set operating temperature. Likewise, there are also optical displays which show the stand-by temperature and the lowering of the operating temperature.

It was also surprisingly found that when cold gas is fed to the moving tool, at the working sit between the tool and the site where the work is to be performed, a good distribution of the cold gas is achieved with simultaneous cooling of the tool and work piece. This cooling makes it possible to immediately work without the need for pre-cooling or else intermediate cooling, as shown by experiments.

An advantageous approach to the cold-gas feed consists of carrying out the feed through the drive shaft of the tool, for example, through a borehole in the center of the tool.

The invention relates to a processing device in which there is a relative movement between the tool and the work piece. This relative movement can consist of a rotation or of an oscillating motion, i which the tool is moved back and forth over the work piece. The invention can also be employed in the same manner for devices in which the tool remains stationary and the work piece carries out a relative movement with respect to the tool.

A preferred embodiment of the invention encompasses the use in disk-shaped, rotating tools, and it is characterized by the arrangement of at least one opening to release the cold gas into the operating area of the tool. In an advantageous manner, several openings are arranged in the form of a circle.

It is possible to achieve an especially good distribution of the cold gas in the operating area when the openings are oriented diagonally towards the outside.

In an advantageous manner, the openings consist of boreholes which are easy to make. But the invention also encompasses an embodiment where the openings are in the form of slits.

An especially good distribution of the cold gas is achieved when the openings are installed in the area of the hub of the rotating tool.

In this context, an especially simple embodiment consists in arranging the openings in the element with which the tool is attached to the drive shaft. It is important that the deflection of the cold gas from the opening into the working area be carried out in such a way that the cold gas preferably encompasses the entire working area.

The term cold gas used here refers to a cold air which has been cooled by suitable means to temperatures substantially lower than minus 20° C. (minus 4° F.). In an advantageous way, however, liquefied gas is employed such as, for instance, liquefied nitrogen having a boiling temperature of minus 196° C. (minus 320.8° F.) or else $CO_2$ having a boiling temperature of minus 79° C. (minus 110.2° F.). Although the use of other liquefied gases is also possible, this is expensive.

The use of a mixture of liquefied gas and compressed air is advantageous, whereby the liquefied gas is sufficiently cold.

The liquefied-gas tank is designed so as to be cold-insulated and it has a heating unit to evaporate the liquefied cold gas, and an after-heating unit at the outlet of the tank in the flow path of the cold gas.

Before the inlet of the cold gas into the tool, there is a temperature sensor in the flow path of the cold gas. This temperature sensor is connected to a control mechanism which adapts the performance of the tank evaporation and/or of the after-heating unit, if the temperature changes at this site. This temperature value is an indicator of the operating temperature at the working area. Likewise, there is a pressure sensor at the outlet of the tank in the flow path of the cold gas, which is also connected to the control mechanism and which serves as an indicator of the amount of flowing cold gas.

In order to save cold gas, according to the invention, there is a mixture tank between the liquefied-gas tank and the tool, to which cold gas and dry pressurized air are fed. Then, this mixture flows to the tool.

By means of appropriately insulated lines, it is possible to attach several tools to a cold-gas tank or mixture tank.

According to another embodiment of the invention, the supply of cold gas for one or more tools can be carried out by means of a mobile intermediate tank, which is replenished by a larger liquefied-gas storage tank.

The tanks connected to the tools can e designed so as to be mobile, stationary or hanging (mobile or stationary).

THE DRAWINGS

FIG. 1 shows a polishing device for the invention above the work piece;

FIG. 2 shows a section of the cold-gas feed of the device of FIG. 1;

DETAILED DESCRIPTION

Figure 3:
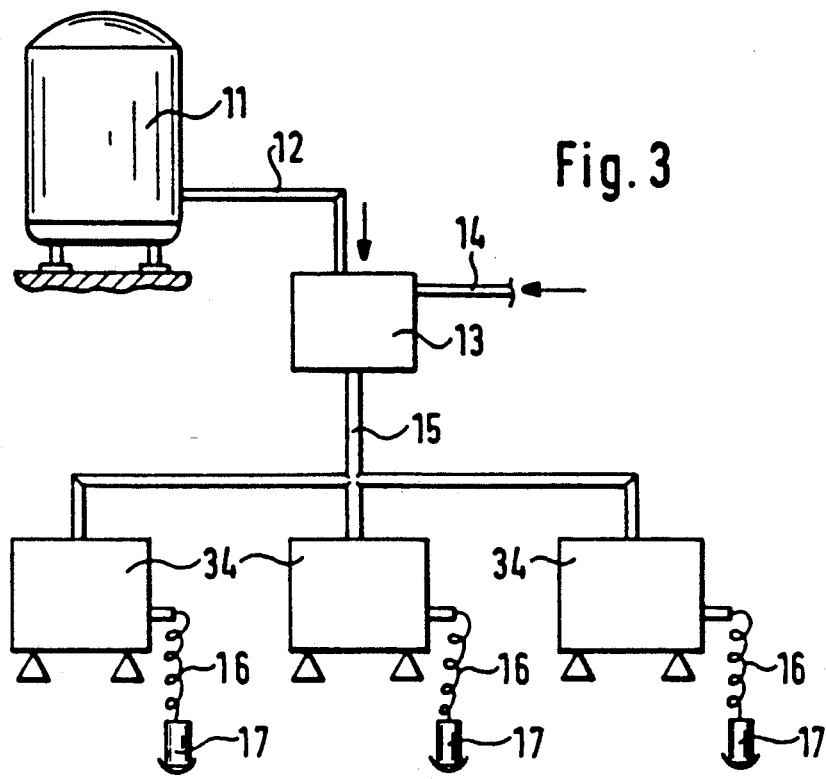
FIG. 3 shows a stationary device according to the invention.

The compressed-air motor 1 is equipped with an angular head 2, to whose drive shaft 3 a polishing disk 4 having a lambskin hood 5 is attached. This attachment is accomplished by a nut 6 that rests upon the hub 7. The cold-gas feed is done by means of an insulated tube 8 and by the angular head 2 in the hollow shaft 3. From there, the cold gas reaches the working area of the polishing disk via the boreholes 9. The rotating lambskin hood 5 functions as a unilaterally open centrifugal pump due to the scooping effect and gas friction. As a result, gas is constantly conveyed out of the working area and replaced by new cold gas. Surprisingly, this effect leads to a permanent cooling of the polishing disk, thus making it possible to initiate the polishing operation immediately, without first cooling the work piece 10.

The cooling effect is further promoted by positioning the polishing disk diagonally to the surface of the work piece 10 during polishing. As a result, the open centrifugal pump closely resembles a closed centrifugal pump with an intensified adhesion effect of the cold gas in the working area. In this manner, the surface to be polished and the entire polishing disk are constantly cooled. In this process, the cooling is completely sufficient and there is no need to interrupt the polishing operation in order to once again cool the work piece.

Another advantage of the invention consists in soaking the polishing disk with polish. It is no longer necessary to cover the surface to be polished with polish although it does not rule out this option.

When designing the processing tool, attention should be paid to ensure that the outflow rate of the cold gas is not higher than the suction effect of the rotating polishing disk.

The stationary device according FIG. 3 consists of a liquefied-gas storage tank 11, from which there is an insulated line 12 leading to a mixture tank 13. There is a line 14 for dry compressed air connected to the mixture tank. An insulated pipeline system 15 leads from the mixture tank 13 to three small insulated tanks 34, which are connected to the processing tools 17 via insulated, flexible connecting tubes 16.

The processing tools 17 can also be connected to a joint tank, depending on the conditions at the work place. It is also possible to connect several processing tools to one tank.

Figure 4:
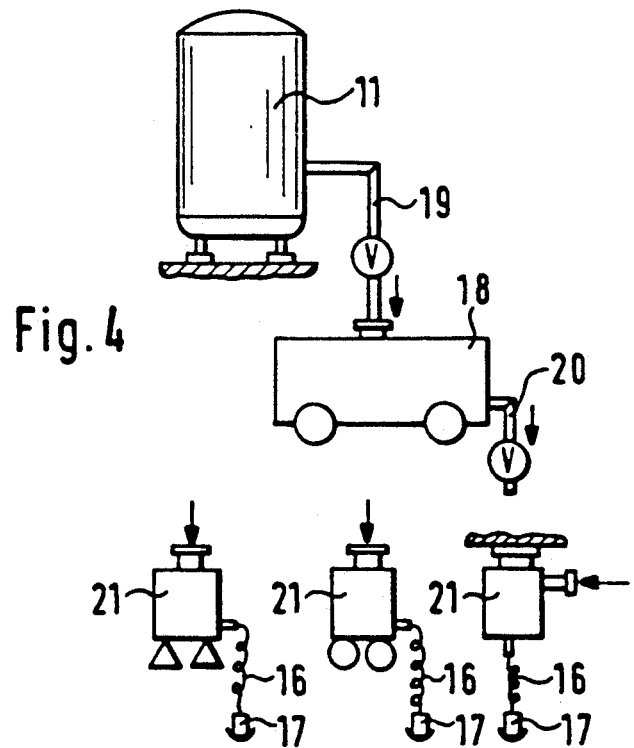
FIG. 4 shows the supply by means of a mobile intermediate tank.

In the case of the device according to FIG. 4, the supply for several tanks 21 comes from the main tank 11 via a mobile intermediate tank 18. This tank is filled via line 19, while emptying takes place via line 20.

Figure 5:
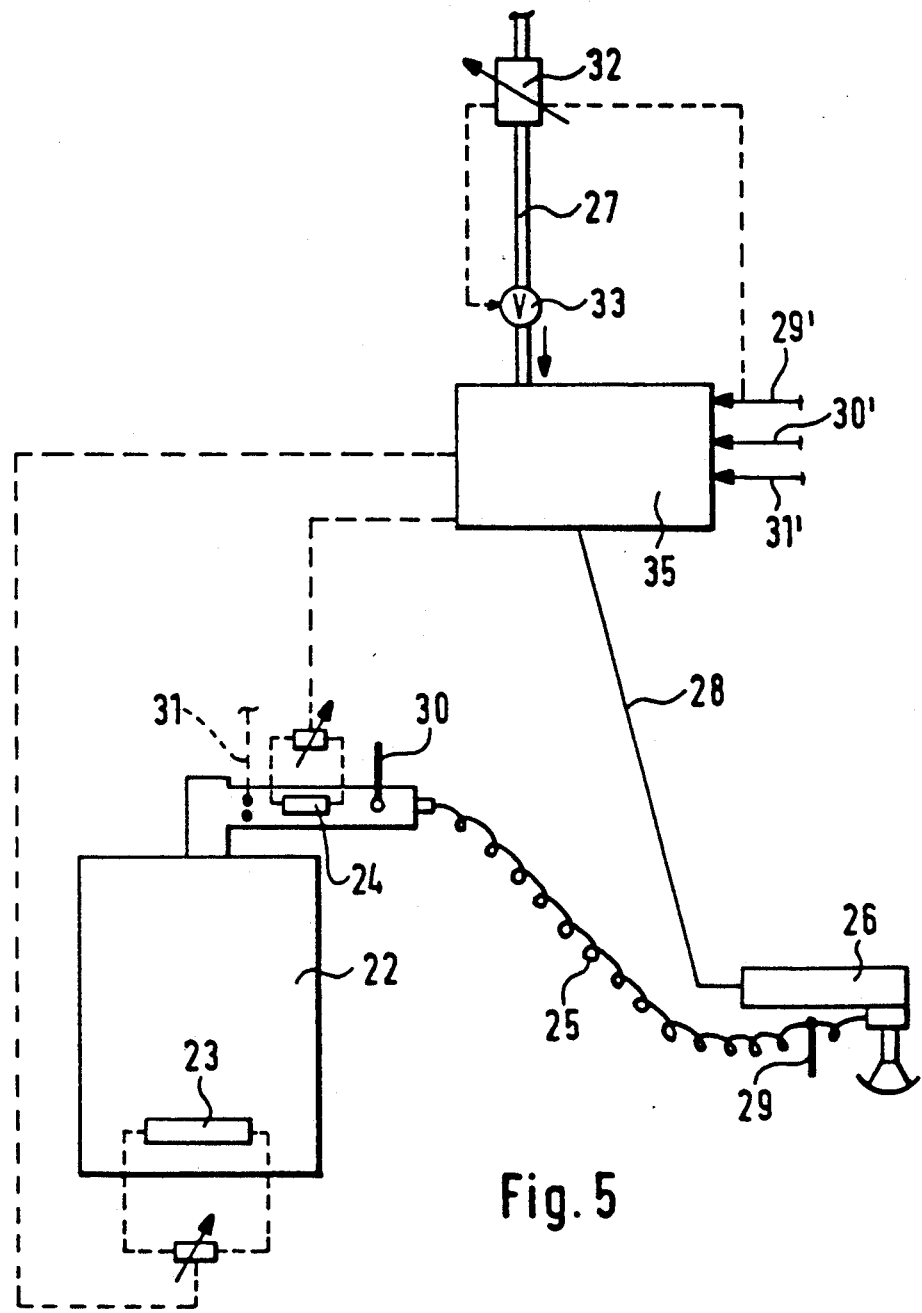
FIG. 5 shows the control mechanism of the device.

FIG. 5 depicts the control mechanism according to the invention. Reference number 22 designates a liquefied-gas tank equipped with a tank heating unit 23 and an after-heating unit 24. The cold gas flows via the connecting tube 25 to the processing tool 26. The tool 26 contains the pressurized air used to runt he motor via the lines 27 and 28. There is a temperature sensor 29 in the tube 25 before the inlet into the tool 26. This temperature sensor 29 is connected to the control mechanism input 29' via electrical lines not shown here. There is another temperature sensor 30 in the flow path after the after-heating unit 24. There is a pressure sensor 31 before the after-heating unit 24. Both sensors are connected to the control mechanism inputs 30' and 31' via electrical lines not shown here. The pressure-differential regulator in the pressurized-air line 27 is designated by reference number 32, while the solenoid valve controlled by this regulator receives the reference number 33. The regulator 32 is connected to the control mechanism inputs 29 of the temperature sensor 29 via an electrical line.

What is claimed is:

1. In a polishing device having a rotatable polishing disc which is movably mounted relative to the surface being treated, the improvement being in that a lambskin hood is mounted over the exposed work surface of said polishing disc, a feed line communicating with the area of said lambskin hood, means for feeding a cold-gas flow through said feed line and directed into said lambskin hood area during operation of said polishing device, said work surface being entirely disposed toward the surface being treated, said cold-gas flow being directed to exit from said entire work surface to be directed at the surface being treated, and said cold gas being selected from the group consisting of cold air and nitrogen and carbon dioxide having a temperature below minus 20° C.

2. Polishing device according to claim 1 characterized in that said means for feeding a cold-gas includes a storage tank, a mixture tank being installed in flow communication with said storage tank and said feed line, and a line for pressurized air being connected to said mixture tank whereby cold-gas and pressurized air are fed to said feed line as a mixture.

3. Polishing device according to claim 1, characterized in that said polishing disc is mounted to a drive shaft, and said feed line being arranged in the center of said drive shaft.

4. Polishing device according to claim 3, characterized in that said polishing disc has a hub, and a plurality of outlet openings for said feed line being in the area of said hub.

5. Polishing device according to claim 3, characterized in that there are several openings for said feed line in the attachment of the polishing disc on said drive shaft.

6. Polishing device according to claim 1, characterized in that said feed line is arranged concentrically around said drive shaft.

7. Polishing device according to claim 6 characterized in that said polishing disc has a hub, and a plurality of outlet openings for said feed line being in the area of said hub.

8. Polishing device according to claim 7, characterized in that said polishing disc is rotatably movable about an axis of rotation, and said openings are oriented diagonally with respect to said axis of rotation towards the outside.

9. Polishing device according to claim 7, characterized in that said openings are arranged in at least one circuit.

10. Polishing device according to claim 6 characterized in that there are several openings for said feed line in the attachment of the polishing disc on said drive shaft.

11. Polishing device according to claim 10, characterized in that said openings are arranged in at least one circuit.

12. Polishing device according to claim 11, characterized in that said polishing disc is rotatably movable about an axis of rotation, and said openings are oriented diagonally with respect to said axis of rotation towards the outside.

13. Polishing device according to claim 10, characterized in that said polishing disc is rotatably movable about an axis of rotation, and said openings are oriented diagonally with respect to said axis of rotation towards the outside.

14. Polishing device according to claim 1, characterized in that said polishing disc has a hub, and a plurality of outlet openings for said feed line being in the area of said hub.

* * * * *